(12) United States Patent
Paget (10) Patent No.: US 8,208,344 B2
(45) Date of Patent: Jun. 26, 2012

(54) METHOD, APPARATUS OR SOFTWARE FOR DETERMINING THE LOCATION OF AN ACOUSTIC EMISSION EMITTER IN A STRUCTURE

(75) Inventor: Christophe Paget, Bristol (GB)

(73) Assignee: Airbus Operations Limited, Bristol (GB)

( * ) Notice: Subject to any disclaimer, the term of this patent is extended or adjusted under 35 U.S.C. 154(b) by 238 days.

(21) Appl. No.: 12/452,436

(22) PCT Filed: Jul. 1, 2008

(86) PCT No.: PCT/GB2008/050529
§ 371 (c)(1),
(2), (4) Date: Dec. 30, 2009

(87) PCT Pub. No.: WO2009/004381
PCT Pub. Date: Jan. 8, 2009

(65) Prior Publication Data
US 2010/0135119 A1    Jun. 3, 2010

(30) Foreign Application Priority Data
Jul. 5, 2007 (GB) .................................. 0712936.4

(51) Int. Cl.
*G01S 3/80* (2006.01)
(52) U.S. Cl. .................................................. 367/127
(58) Field of Classification Search .................. 367/127
See application file for complete search history.

(56) References Cited

U.S. PATENT DOCUMENTS

| | | | |
|---|---|---|---|
| 3,919,883 A * | 11/1975 | Nakamura et al. | 73/587 |
| 4,352,167 A * | 9/1982 | Hashimoto et al. | 367/127 |
| 4,586,378 A | 5/1986 | Izumi et al. | |
| 5,528,557 A | 6/1996 | Horn | |
| 5,754,497 A * | 5/1998 | Tapia-Egoavil | 367/127 |
| 5,940,788 A * | 8/1999 | Morman et al. | 702/138 |
| 6,910,013 B2 * | 6/2005 | Allegro et al. | 704/256 |
| 7,158,643 B2 * | 1/2007 | Lavoie et al. | 381/58 |
| 2001/0047691 A1 | 12/2001 | Dzenis | |
| 2004/0052295 A1 * | 3/2004 | Draxton et al. | 374/117 |
| 2005/0243649 A1 * | 11/2005 | Kuppuswamy et al. | 367/118 |
| 2006/0126855 A1 * | 6/2006 | Geiger et al. | 381/56 |

(Continued)

FOREIGN PATENT DOCUMENTS
EP    0 518 508    12/1992
(Continued)

OTHER PUBLICATIONS

T.M. Roberts, M. Talebzadeh, "Acoustic emission monitoring of fatigue crack propagation", Journal of Constructional Steel Research, vol. 59, Issue 6, Jun. 2003, pp. 695-712.*

(Continued)

*Primary Examiner* — Thomas Tarcza
*Assistant Examiner* — James Hulka
(74) *Attorney, Agent, or Firm* — Nixon & Vanderhye P.O.

(57) ABSTRACT

A method, apparatus and software is disclosed in which the location of the origin of a received acoustic emission in a structure is calculated by triangulating the times of flight of the acoustic emission to a distributed set of sensors and using a predetermined acoustic model of the structure.

29 Claims, 12 Drawing Sheets

U.S. PATENT DOCUMENTS

| | | | | |
|---|---|---|---|---|
| 2006/0241916 A1* | 10/2006 | Sieracki | ....................... | 702/189 |
| 2007/0159924 A1* | 7/2007 | Vook et al. | .................... | 367/127 |
| 2008/0084788 A1* | 4/2008 | Showen et al. | ............... | 367/127 |
| 2009/0070048 A1* | 3/2009 | Stothers et al. | ................. | 702/39 |

FOREIGN PATENT DOCUMENTS

| EP | 0 907 078 | 4/1999 |
|---|---|---|
| WO | WO 2006/005960 | 1/2006 |

OTHER PUBLICATIONS

A. Carpinteri, G. Lacidogna, N. Pugno, "Structural damage diagnosis and life-time assessment by acoustic emission monitoring", Engineering Fracture Mechanics, vol. 74, Issues 1-2, Jan. 2007.*

International Search report for PCT/GB2008/050529, mailed Nov. 6, 2008.

Written Opinion for PCT/GB2008/050529, mailed Nov. 6, 2008.

GB Search Report for GB 0712936.4, dated Oct. 23, 2007.

* cited by examiner

| Data Point ID | Data Point Location | Distance from Origin (mm) | Material ID | Thickness (mm) |
|---|---|---|---|---|
| 0001 | 123,234,345 | 534 | 001 | 012 |
| 0002 | 234,345,456 | 345 | 001 | 012 |
| 0003 | 567,234,456 | 677 | 003 | 002 |
| 0004 | 523,734,743 | 856 | 005 | 030 |
| 0005 | 624,785,323 | 756 | 001 | 024 |
| 0006 | 623,745,745 | 412 | 003 | 004 |
| 0007 | 734,876,125 | 967 | 003 | 008 |

Figure 5

| Data Point ID | Neighbours' IDs |
|---|---|
| 0001 | 0034, 0035, 0078, 0079 |
| 0002 | 0035, 0036, 0079, 0080 |

Figure 6

| Sensor ID | Sensor Location | Frequency (kHz) | Channel Number | Sphere of Influence (mm) |
|---|---|---|---|---|
| 001 | 346,764,234 | 600 | 1 | 2000 |
| 002 | 745,456,234 | 600 | 2 | 2000 |
| 003 | 576,723,484 | 600 | 3 | 2000 |
| 004 | 875,284,629 | 600 | 4 | 2000 |
| 005 | 835,492,711 | 300 | 5 | 1500 |
| 006 | 027,266,829 | 150 | 6 | 800 |
| 007 | 234,412,412 | 75 | 7 | 500 |
| 008 | 927,203,222 | 75 | 8 | 500 |
| 009 | 340,249,024 | 150 | 9 | 800 |
| 010 | 238,339,003 | 300 | 10 | 1500 |
| 011 | 312,523,677 | 300 | 11 | 1500 |

Figure 7

| Data Point ID | Sensor ID | Shortest Path Set |
|---|---|---|
| 0001 | 001 | 0002, 0003, 0034, 0035, 0045, 0046 |
| 0001 | 002 | 0003, 0034, 0035, 0045, 0046 |
| 0001 | 003 | 0034, 0035, 0056, 0078 |
| 0001 | 004 | 0067, 088, 0093, 0193 |

Figure 8

| Material ID | Assigned Velocity (m/s) | Density(g/cm3) | Modulus of Elasticity (GPa) | Poisson Coefficient |
|---|---|---|---|---|
| 001 | 5500 | 2.7 | 69 | 0.33 |
| 002 | 6500 | 1.1 | 150 | 0.15 |
| 003 | 5100 | 7.8 | 200 | 0.29 |

Figure 9

| Data Point ID | Sensor IDs | Frequency(kHz) | Time of Flights (micro seconds) |
|---|---|---|---|
| 0001 | 001, 002, 003, 004 | 600 | 0, 23, 25, 24 |
| 0002 | 001, 002, 003, 004 | 600 | 0, 24, 26, 23 |
| 0003 | 001, 002, 003, 004 | 600 | 0, 25, 27, 22 |
| 0004 | 001, 002, 003, 004 | 600 | 0, 26, 28, 21 |
| 0005 | 001, 002, 003, 004 | 300 | 5, 0, 34, 35 |

Figure 10

| Timestamp | Sensor IDs | Frequency | Time of Flights |
|---|---|---|---|
| 12:5:07:10:23:34:11 | 001, 002, 003, 004 | 600 | 0, 23, 26, 22 |
| | | | |

METHOD, APPARATUS OR SOFTWARE FOR DETERMINING THE LOCATION OF AN ACOUSTIC EMISSION EMITTER IN A STRUCTURE

This application is the U.S. national phase of International Application No. PCT/GB2008/050529 filed 1 Jul. 2008 which designated the U.S. and claims priority to GB Application No. 0712936.4 filed 5 Jul. 2007, the entire contents of each of which are hereby incorporated by reference.

FIELD OF INVENTION

The present invention relates to a method, apparatus or software for determining the location of an acoustic emission emitted in a structure.

BACKGROUND OF THE INVENTION

Any structure may suffer damage during its use that may lead to the eventual failure of the structure. In many scenarios, it is important to monitor damage so that the damage can be repaired or the structure can be replaced before any failure or degradation of performance occurs. Many such structures are built and used in the aeronautical, aerospace, maritime, or automotive industries.

When damage occurs within a structure, the damaged area emits a sound or acoustic emission (AE) that propagates through the material of the structure. Damage monitoring systems, in the form of acoustic emission detection and monitoring systems, have been provided that detect the acoustic emission made as damage occurs to a structure. The acoustic emissions are detected by sensors attached at known locations in the structure. The time of flight (ToF) of the acoustic emission to each sensor is recorded. The location of the AE can then be determined using triangulation of the ToFs for a given AE from the known locations for the receiving sensors.

However, acoustic emissions may travel at different velocities through different parts of a structure depending on its structural properties. In other words, the propagation of an acoustic emission through a structure can be considered to be non-linear. Thus the mechanical properties of the material from which the structure is formed, such as the density, modulus of elasticity and Poisson coefficient, have an effect on the velocity of an AE. Furthermore, structural features such as changes in thickness, material boundaries or voids also have an effect on the velocity and propagation path of an AE. Such variation in the propagation of AEs through structures reduces the accuracy to which an AE event can be located using existing acoustic emission detection and monitoring systems.

SUMMARY OF THE INVENTION

An embodiment of the invention provides a method for determining the location of an acoustic emission emitted in a structure, the method comprising the steps of:

a) selecting a set of data points, each the data point being located at a known location in a structure to be monitored for acoustic emissions;

b) determining a set of time of flights (ToFs) for an acoustic emission emitted from each data point to each of a set of predetermined sensor locations in the structure;

c) providing a set of sensors in the structure at each of the set of predetermined sensor locations, each sensor being arranged to detect acoustic emissions from the structure;

d) receiving an acoustic emission at the sensors and determining the set of ToFs of the acoustic emission to each sensor;

e) identifying the or each closest match between the set of ToFs determined for the data points and the set of ToFs for the received acoustic emission so as to determine the set of closest data points to the origin of the acoustic emission; and f) interpolating the location of the origin of the acoustic emission using the known locations, the sets of ToFs for each of the set of closest data points and the set of ToFs for the received acoustic emission.

The interpolation may be trigonometric interpolation. The set of ToFs for the acoustic emission and for each data point may be measured relative to the shortest ToF in each set. The sets of ToFs for the data points may be predetermined. The data points are located on a model of the structure, the model being used for determining the sets of ToFs for the data points. The sets of ToFs for the data points may be determined from a set of one or more candidate shortest paths in the model between each data point via a set of other data points to each of the sensor locations, the ToF for each path being calculated taking into account acoustic emission propagation characteristics of the given path.

The data point locations may be arranged as a grid, the data points being located at the vertices of the grid and each edge of the grid defining a possible path between the data points. The data points may be interconnected by four or more edges. Each ToF for said data points may be calculated taking into account the structural properties of the respective shortest path. The structural properties of the structure may be defined for each vertex of the grid. The structural properties may comprise the mechanical properties of the structure. The structural properties may comprise the structural features of the structure. The structural properties may comprise the acoustic emission propagation characteristics of the structure. The acoustic emission propagation characteristics may be defined for one or more wave modes. Each of the set of ToF for the data points may be determined for a set of one or more acoustic emission frequency bands. The received acoustic emission may be analysed with respect to one or more of the acoustic emission frequency bands.

Another embodiment provides apparatus for determining the location of an acoustic emission emitted in a structure, the apparatus being operable to:

select a set of data points, each data point being located at a known location in a structure to be monitored for acoustic emissions;

determine a set of time of flights (ToFs) for an acoustic emission emitted from each data point to each of a set of predetermined sensor locations in the structure;

provide a set of sensors in the structure at each of the set of predetermined sensor locations, each sensor being arranged to detect acoustic emissions from the structure;

receive an acoustic emission at the sensors and determine the set of ToFs of the acoustic emission to each sensor;

identify the or each closest match between the set of ToFs determined for the data points and the set of ToFs for the received acoustic emission so as to determine the set of closest data points to the origin of the acoustic emission; and interpolate the location of the origin of the acoustic emission using the known locations, the sets of ToFs for each of the set of closest data points and the set of ToFs for the received acoustic emission.

A further embodiment provides a program or a group of programs arranged to enable a programmable device or group of the devices to perform a method for determining the location of an acoustic emission emitted in a structure, the method comprising the steps of:

a) selecting a set of data points, each data point being located at a known location in a structure to be monitored for acoustic emissions;

b) determining a set of time of flights (ToFs) for an acoustic emission emitted from each data point to each of a set of predetermined sensor locations in the structure;

c) providing a set of sensors in the structure at each of the set of predetermined sensor locations, each sensor being arranged to detect acoustic emissions from the structure;

d) receiving an acoustic emission at the sensors and determining the set of ToFs of the acoustic emission to each sensor;

e) identifying the or each closest match between the set of ToFs determined for the data points and the set of ToFs for the received acoustic emission so as to determine the set of closest data points to the origin of the acoustic emission; and f) interpolating the location of the origin of the acoustic emission using the known locations, the sets of ToFs for each of the set of closest data points and the set of ToFs for the received acoustic emission.

Another embodiment provides a program or a group of programs arranged to enable a programmable device or group of the devices to provide apparatus for determining the location of an acoustic emission emitted in a structure, the apparatus being operable to:

select a set of data points, each the data point being located at a known location in a structure to be monitored for acoustic emissions;

determine a set of time of flights (ToFs) for an acoustic emission emitted from each data point to each of a set of predetermined sensor locations in the structure;

provide a set of sensors in the structure at each of the set of predetermined sensor locations, each sensor being arranged to detect acoustic emissions from the structure;

receive an acoustic emission at the sensors and determine the set of ToFs of the acoustic emission to each the sensor; identify the or each closest match between the set of ToFs determined for the data points and the set of ToFs for the received acoustic emission so as to determine the set of closest data points to the origin of the acoustic emission; and interpolate the location of the origin of the acoustic emission using the known locations, the sets of ToFs for each of the set of closest data points and the set of ToFs for the received acoustic emission.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS OF THE INVENTION

Figure 1:
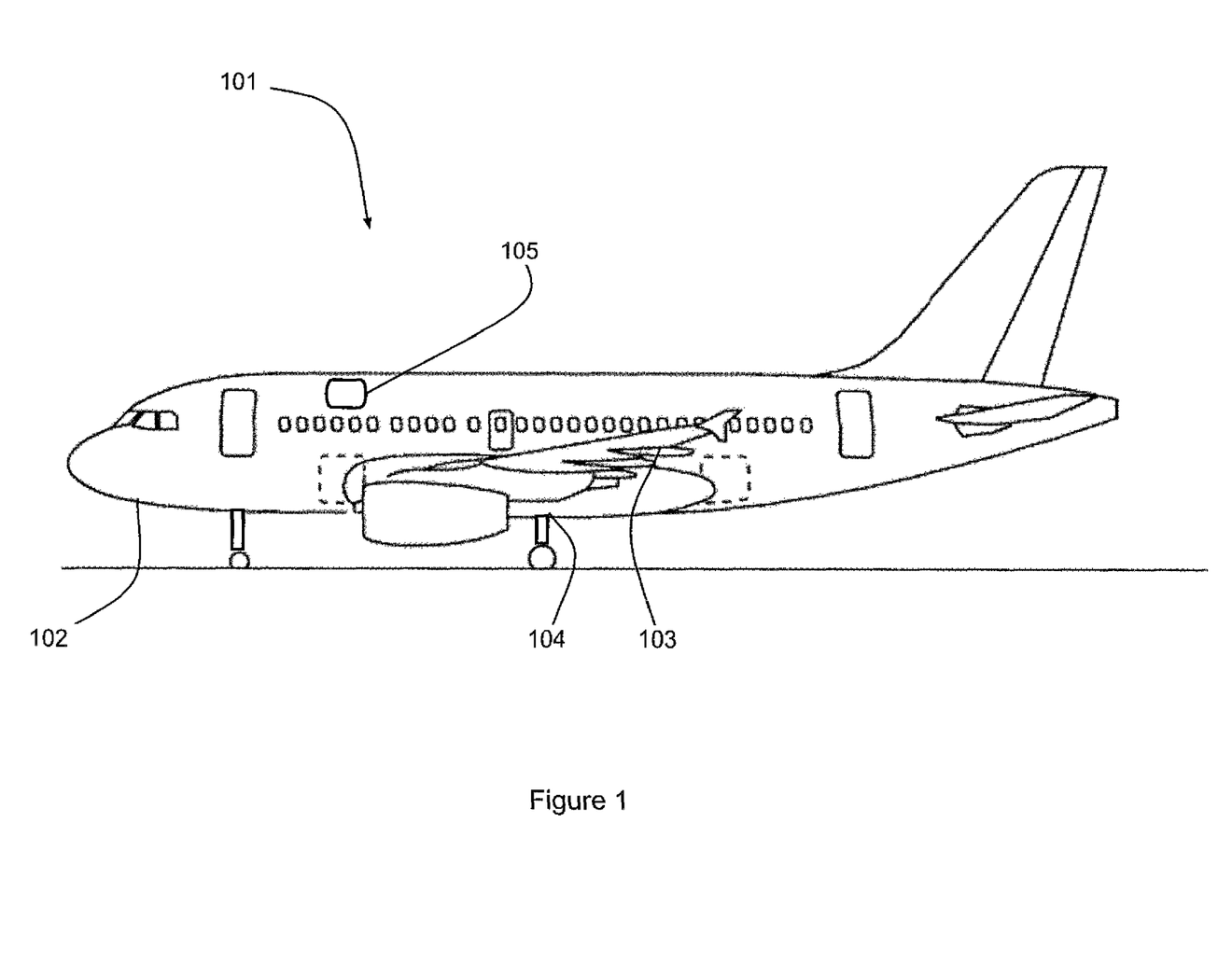
FIG. 1 is a side view of a structure in the form of an aircraft.
Figure 2:
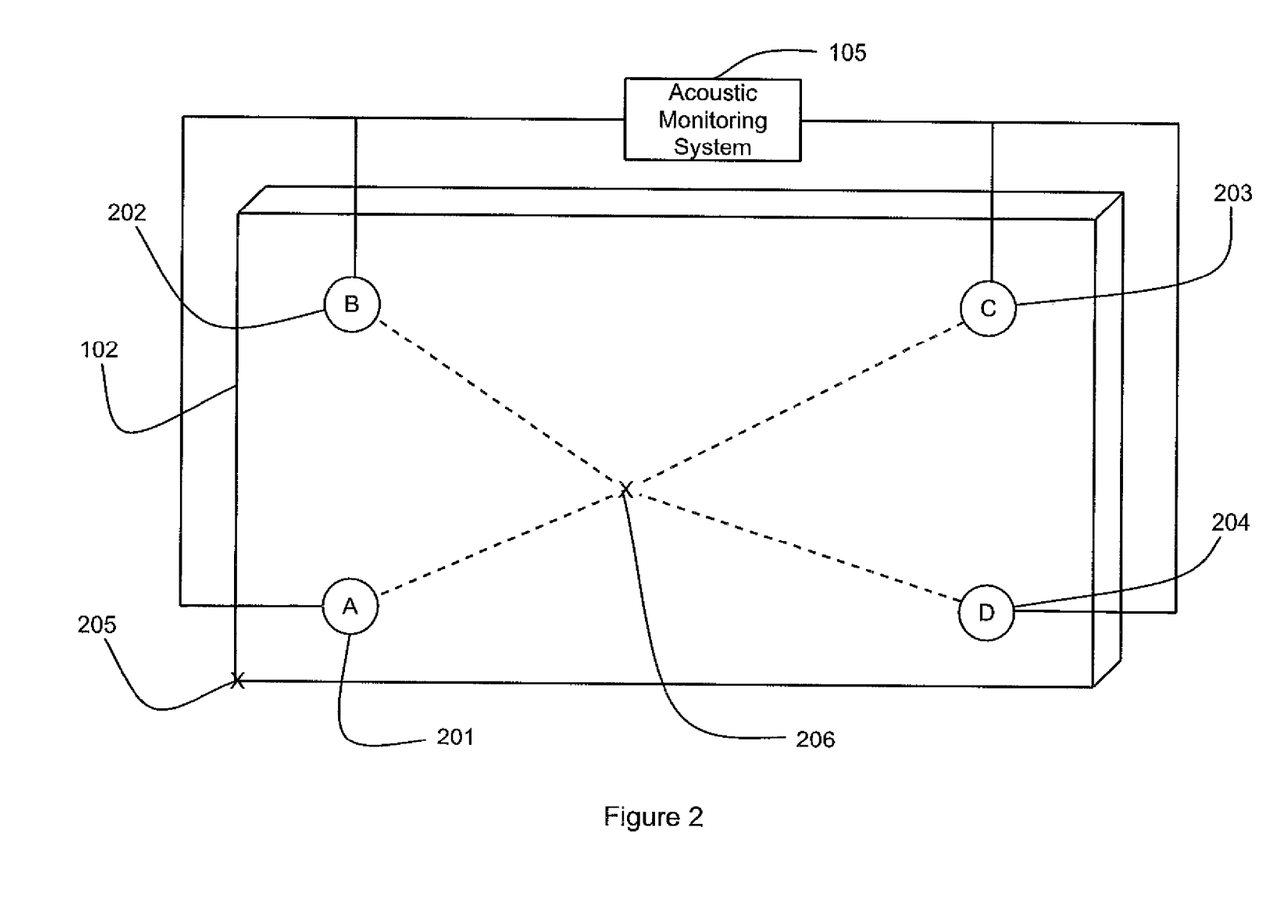
FIG. 2 is a schematic illustration of an acoustic emissions detection system in the aircraft of FIG. 1.

With reference to FIG. 1, an aircraft 101 comprises a fuselage 102 and a set of wings 103 faired into the fuselage 102 via fairings 104. The aircraft 101 further comprises an acoustic emission (AE) monitoring system 105 arranged to detect acoustic emissions caused by damage to the structure of the aircraft 101, via a set of acoustic sensors (not shown) attached to the structure of the aircraft 101. The sensors are arranged to detect acoustic emissions from the aircraft structure so as to enable the identification of the area of the aircraft structure that requires inspection or repair. With reference to FIG. 2, which shows a section of the fuselage 102, the sensors 201, 202, 203, 204 are attached in a grid pattern at known locations from a reference point 205. Each sensor 201, 202, 203, 204 is connected to the acoustic emission (AE) monitoring system 105.

If damage occurs, for example at a site 206 in the fuselage, an acoustic emission is emitted from the site 206 and propagates though the fuselage towards the sensors 201, 202, 203, 204. The respective path lengths, between the damage location 206 and the sensors 201, 202, 203, 204, will differ because the speed at which the acoustic emission propagates along the respective paths varies in accordance with the structural properties of the respective path. For example, the mechanical properties of the material from which the fuselage is formed, such as the density, modulus of elasticity and Poisson coefficient, have an effect on the propagation of an acoustic emission. Furthermore, structural features such as changes in thickness, material boundaries or voids also have an effect on the propagation of an acoustic emission. As a result the acoustic emission will be detected at each of the sensors 201, 202, 203, 204, at different times.

In the example of FIG. 2, the acoustic emission is detected by sensor A 201 first, followed by the sensor B 202, sensor C 203 and then sensor D 204. The acoustic emission monitoring system 105 is arranged to record a set of ToFs for the acoustic emission as a set of relative time measurements, that is, as time measurements relative to the first detection of the acoustic emission by any one of the sensors 201, 202, 203, 204. In other words, the relative time for sensor A is zero and the relative time for the other sensors B, C, D is time difference between the detection of the acoustic emission at sensor A and its subsequent reception at the other sensors B, C, D.

Figure 3:
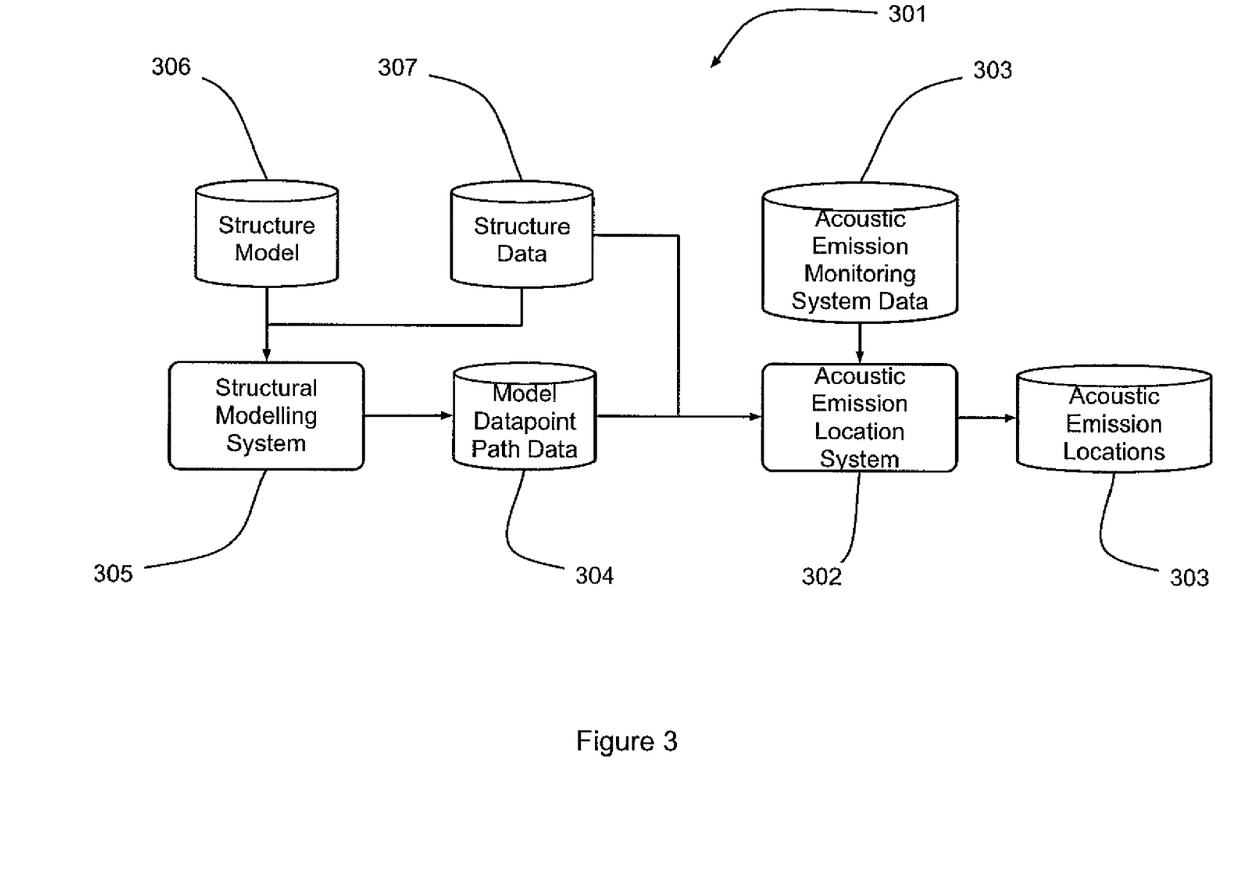
FIG. 3 is a schematic illustration of a computer system for locating the origin of acoustic emissions detected by the system of FIG. 2.

With reference to FIG. 3, a computer system 301 comprises a first application program in the form of an acoustic emissions location system 302 arranged to take the acoustic emissions monitoring data 303 produced by the acoustic monitoring system 105 as its input. The acoustic emissions location system 302 processes the data 303 to determine the physical location of the origin of the acoustic emission. In order to locate the origin, the acoustic emissions location system 302 uses model data point path data 304 produced by a second application program in the form of a structural modelling system 305. The structural modelling system 305, in the form of a Computer Aided Design and Drafting System (CADDS) such as CATIA™ produced by the IBM™ Corporation, is arranged to process a model of a physical structure in the form of a structure model 306. In the present embodiment, the structure model represents a part of the aircraft fuselage 102. The structure model 306 is augmented with structure data 307 representing the mechanical properties of the structure represented by the structure model 306. For example, in the present embodiment, the structure data 307 comprises data on the materials from which the structure is formed, the material density, modulus of elasticity, Poisson coefficient, variations in thickness, material boundaries and voids. The structure data 307 will be described in further detail below.

Figure 4:
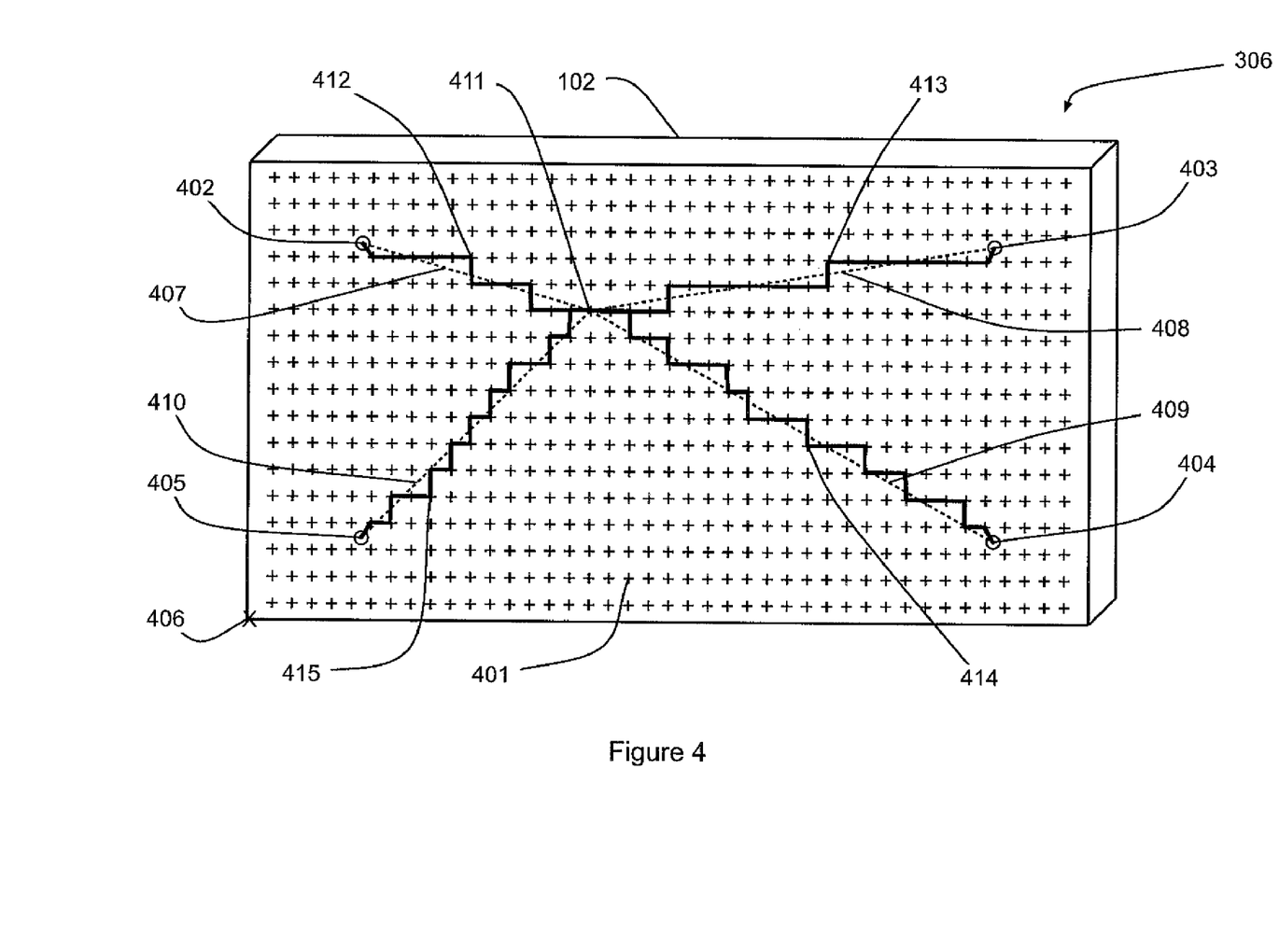
FIG. 4 is an illustration of a model of an aircraft structure used in the computer system of FIG. 3.

FIG. 4 shows the structure model 306 in further detail. The structure model 306 comprises a three dimensional representation of the fuselage structure 102. A set of data points 401 are added to the model 306 and are arranged in a grid over the structure model 306. In addition, a set of sensor locations 402, 403, 404, 405 is defined at points on the model 306 that correspond directly to the positions of the physical sensors 201, 202, 203, 204 that form part of the acoustic emissions monitoring system 105. The location of each data point 401 and sensor location 402, 403, 404, 405 are measured relative to a model reference point 406, which corresponds to the physical reference point 205. The structure modelling system 305 is arranged to take each data point 401 and to calculate the shortest ToFs for acoustic emissions travelling between the given data point 401 and each sensor location 402, 403, 404, 405.

FIG. 4 shows an example of the actual shortest paths 407, 408, 409, 410 in the structure model 306 from a data point 411 to the sensor locations 402, 403, 404, 405. The structure modelling system 305 is arranged to calculate a set of candidate shortest paths by identifying the set of paths, under a predetermined threshold length, that travel between the data point 411 and the sensor locations 402, 403, 404, 405 in discrete steps via the interposed data points 401. Having calculated the set of candidate shortest paths, the structure modelling system 305 is then arranged to take into account the structure data 307 for the data points 401 along each of the set of candidate shortest path. This enables the selection of the paths 412, 413, 414, 415 that provide the shortest ToFs between the data point 411 and each respective sensor location 402, 403, 404, 405. These calculated ToFs are referred to herein as the data point ToFs.

As described above, the set of candidate shortest paths is the set of all paths from the selected data point to each identified sensor that are less than a predetermined distance threshold. A number of candidate paths between the data point 411 and a given sensor location are selected at this stage because, prior to calculating the ToFs for each path, it is not possible to determine the fastest path, that is, the path providing the shortest ToF. This is because the ToF is governed by the physical attributes of a given path. In other words, the physically shortest path may not have the shortest ToF because its physical attributes may delay the transmission of an acoustic emission by a greater degree than some other physically longer path.

In mechanical structures, such as aircraft sections or components, which are predominantly constructed of plates, the waves of an acoustic emission form particular types of plate waves as Lamb waves. Lamb waves have a number of different oscillatory patterns or modes that are capable of maintaining their shape and propagating in a stable manner. Changes in the mechanical form of a structure, such as a boundary between one material and another or changes is cross sectional thickness of a given material, can effect the Lamb waves of an acoustic emission. For example, a material joint may delay an acoustic emission, reduce its amplitude or change its mode. Different wave modes may be affected differently by such structural variations. For example, one wave mode may be attenuated differently to another mode by a given structural variation along the wave path. Indeed the attenuation of some modes may be so great that the given mode fail to reach a given sensor location with a detectable amplitude. The effect of such structural variation on an acoustic emission can be calculated using known attenuation and dispersion data for the relevant materials. Such data is commonly represented by attenuation and dispersion functions or curves. Such attenuation and dispersion functions take into account changes in wave mode. The structure modelling system 305 is arranged to take into account the effects of structural variation on the acoustic emission wave modes when determining the ToFs for each of the set of candidate shortest paths, thus enabling the selection of the path having the shortest ToF.

The structure modelling system 305 is arranged to store the data point ToFs as relative times, in the same manner as the acoustic emission ToFs described above. In other words, the data point ToFs for each data point 401 are stored as relative times based on the sensor location having the shortest ToF. Thus, the ToF for the sensor location having the shortest ToF is zero and the remaining sensors have ToFs that are the subsequent time differences in their respective ToFs.

Figure 5:
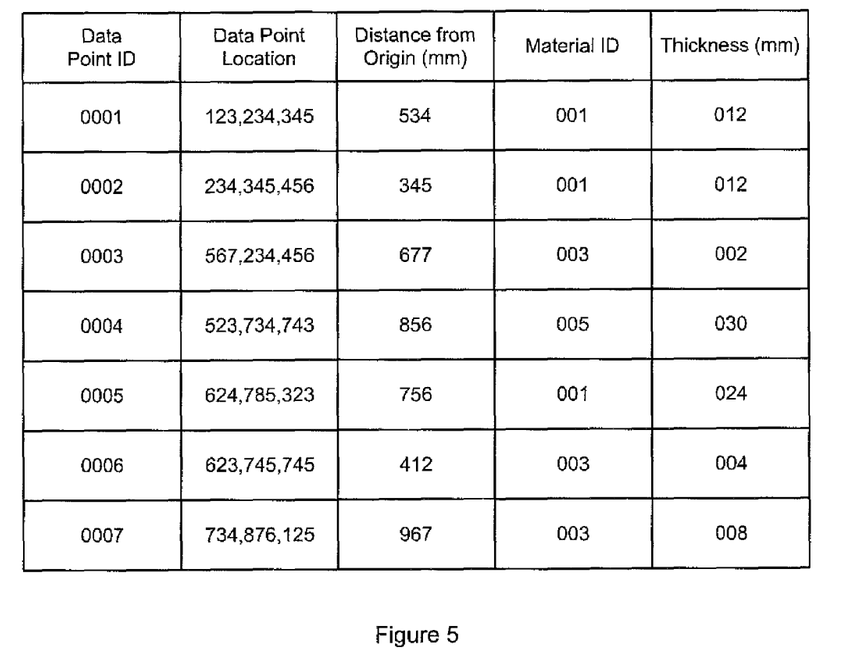
FIGS. 5 to 11 are tables of data used in the computer system of FIG. 3.
Figure 6:
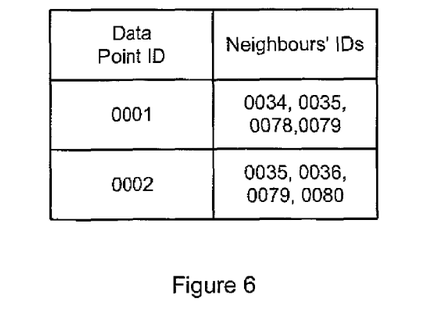

The structure data 307 in the present embodiment will now be described in further detail with reference to FIGS. 5 to 7 and 9. The table of FIG. 5 shows an example of the data representing the data points 401, which comprises a unique identifier for each data point and location data determining the location of each data point relative to the reference point 406. The straight-line distance for each data point 401 from the model reference point 406 is stored, along with a unique identifier for the material from which the physical structure 102 is comprised at the corresponding physical location, along with the thickness of the material at that location. The table of FIG. 6 shows data that identifies, for each data point 401, the immediately neighbouring data points on the grid. In the present embodiment, each data point 401 has four immediate neighbours. The neighbouring data point data is used by the shortest path algorithm of the structural modelling system 305 when identifying the shortest paths 412, 413, 414, 415.

Figure 7:
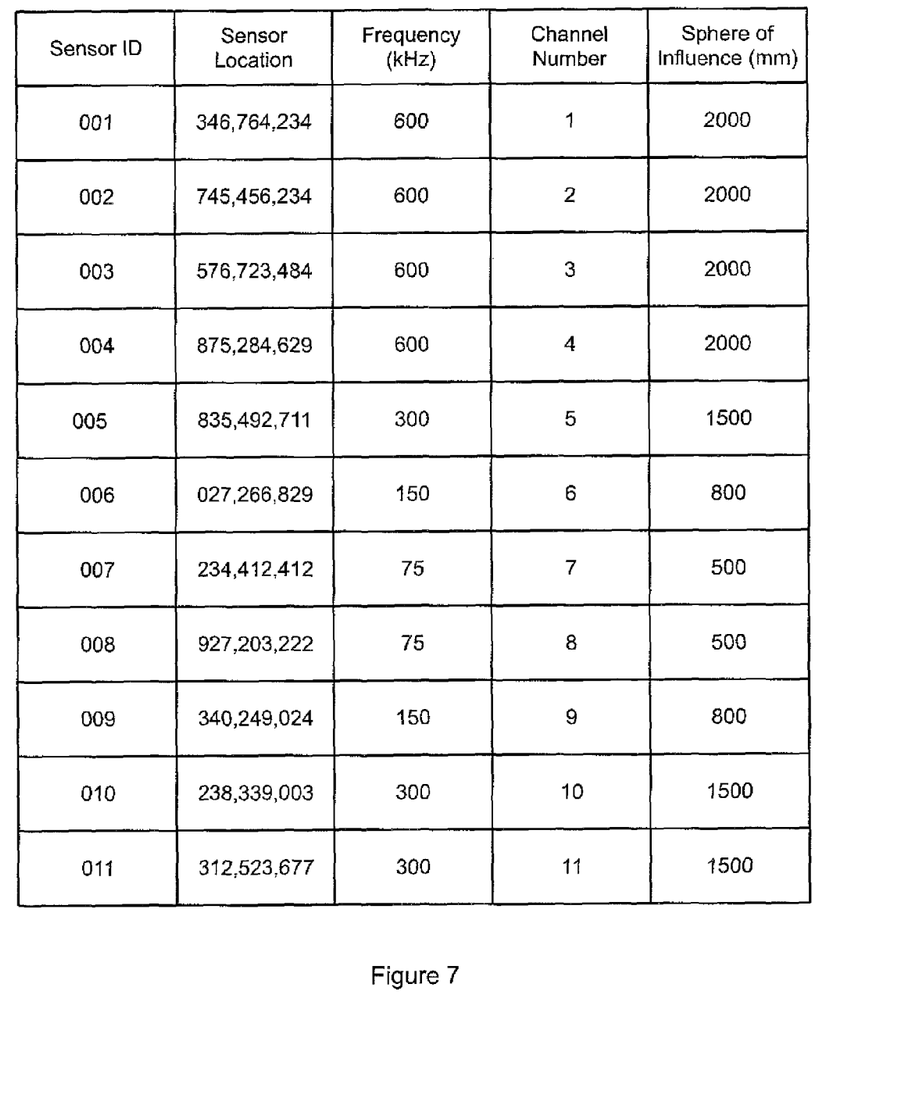

The table of FIG. 7 shows an example of data representing the physical sensors 201, 202, 203, 204 in which each sensor is assigned a unique identification number. The location of each sensor 201, 202, 203, 204 is recorded along with the acoustic emission detection frequency and channel number on which the given sensor communicates with the acoustic emissions detection system 102. In addition, the sphere of influence to each sensor is recorded, that is, the range within which a given sensor can effectively detect an acoustic emission. The sensor locations defined in the table of FIG. 7 are the locations of both the physical sensors 201, 202, 203, 204 and the model sensor locations 402, 403, 404, 405. The sensor frequencies are selected depending on the natural resonant frequency of the material in the region of the structure where the sensor is located. Thus the sensors 201, 202, 203, 204 are best suited to detect AE emitted in their vicinity. Sensors that are located close to each other are arranged to communicate with the acoustic emissions monitoring system on different communications channels so as to enable their signals to be distinguished. The frequency and sphere of influence data enables the calculation of the data point ToFs to be more efficient since the only the shortest paths to the locations sensors operating at the relevant frequency and within range need to be considered.

Figure 8:
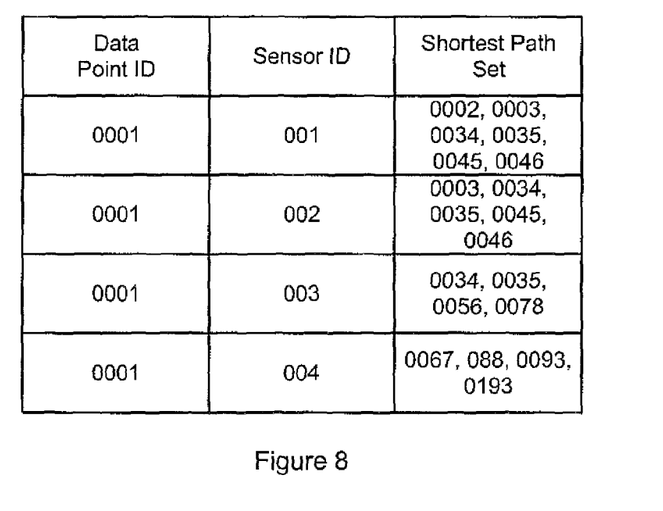
Figure 9:
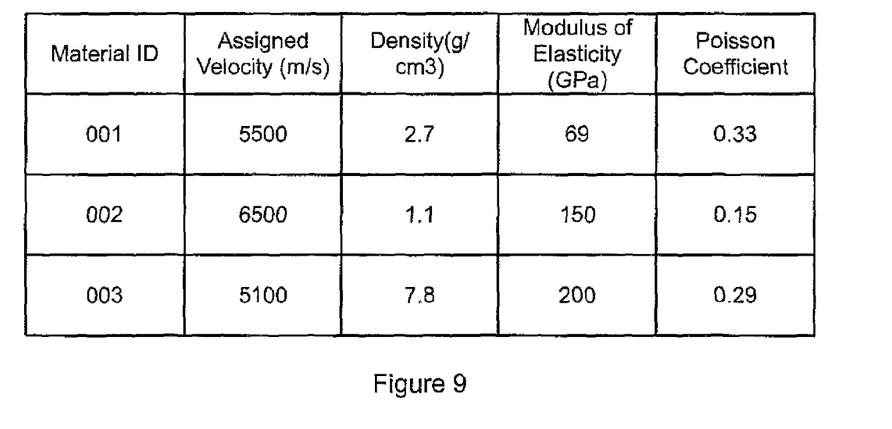

The table of FIG. 8 shows an example of data representing the shortest paths calculated between each data point 401 in the model 306. Each data point and sensor location is identified by its unique identifier as described in the tables of FIGS. 5 and 7 respectively. Each of the set of candidate shortest path is defined by the list of data point identifiers through which the path travels. In FIG. 8, for clarity, only one of the candidate shortest paths is shown. The table of FIG. 9 shows an example of data representing properties of the materials identified at each data point in the table of FIG. 5. The material properties are those that affect the propagation of an acoustic emission through the material. In the present embodiment, each material is assigned a velocity based on its properties. In addition, the properties from which each assigned velocity is calculated are also recorded. These properties comprise the material's density, its Young's modulus and its Poisson Coefficient and the relevant dispersion curve as described above.

Figure 10:
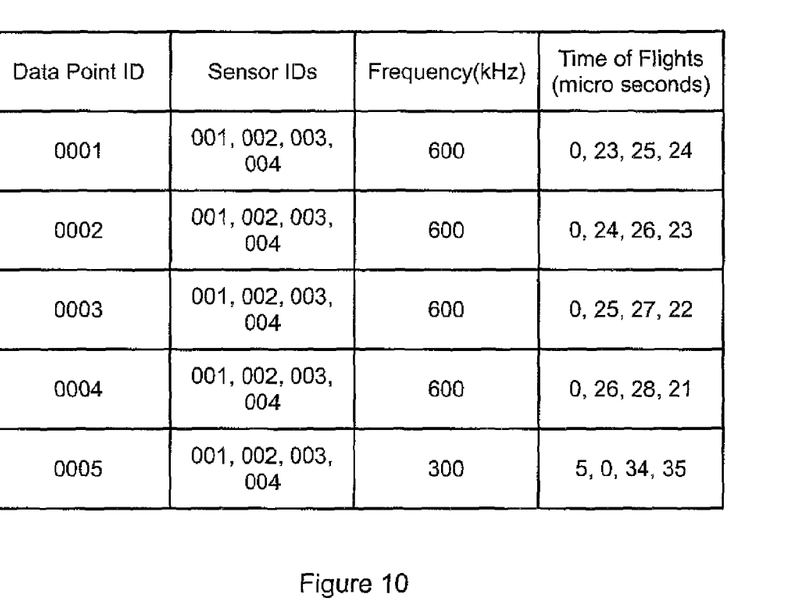
Figure 11:
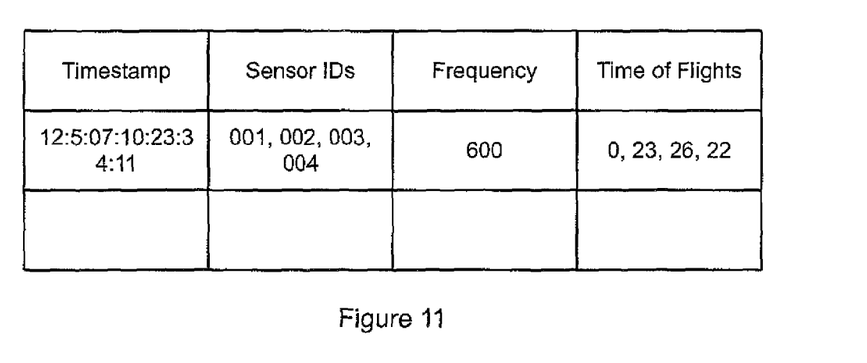

The table of FIG. 10 shows an example of data representing the shortest ToFs calculated by the structural modelling system 305 for each data point 401 in the model 306 using the structure data 307. In other words, the contents of the table of FIG. 10 represent the data point ToFs. For each data point the table lists the set of sensors to which the data point ToFs have been calculated, the frequencies at which those sensors are operating and the relative data point ToFs to each sensor. The sensors are listed in numerical order by their unique identifier and the corresponding ToFs are listed in the same order. As noted above, the shortest ToF is stated as zero. The table of FIG. 11 shows an example of data representing an acoustic emission detected by the acoustic monitoring system 102. Each acoustic emission is referenced by a time stamp, which identifies the precise time and date on which the acoustic emission was first detected. The sensors that detected the acoustic emission are listed in numerical order of their respective unique identifiers and the relative ToFs for each respective sensor are listed in the corresponding order. As noted above, the sensor that first received the acoustic emission has a zero ToF. In addition, the frequency at which the acoustic emission was received is also noted, which is needed if multi frequency sensors are utilized to correctly process acoustic emission ToFs against data point ToFs as described in further detail below.

The acoustic emission location system 302 described above is arranged to match the acoustic emissions in the table of FIG. 11 with the closest data points 401 to the origin of the acoustic emission. The matching process is performed by identifying the data points 401 having a set of data point ToFs closest to those of the acoustic emission ToFs for the same set of sensors. Thus, taking the table of FIG. 10, it can be seen that the data points "0001", "0002" and "0003" have the closest sets of ToFs to that of the acoustic emission in the table of FIG. 11. The next step performed by the acoustic emission locating system 302 is to use trigonometric interpolation to identify the location of the origin of the acoustic emission using the known locations of the closest data points 401, the corresponding data point ToFs and the acoustic emission ToFs.

Figure 12:
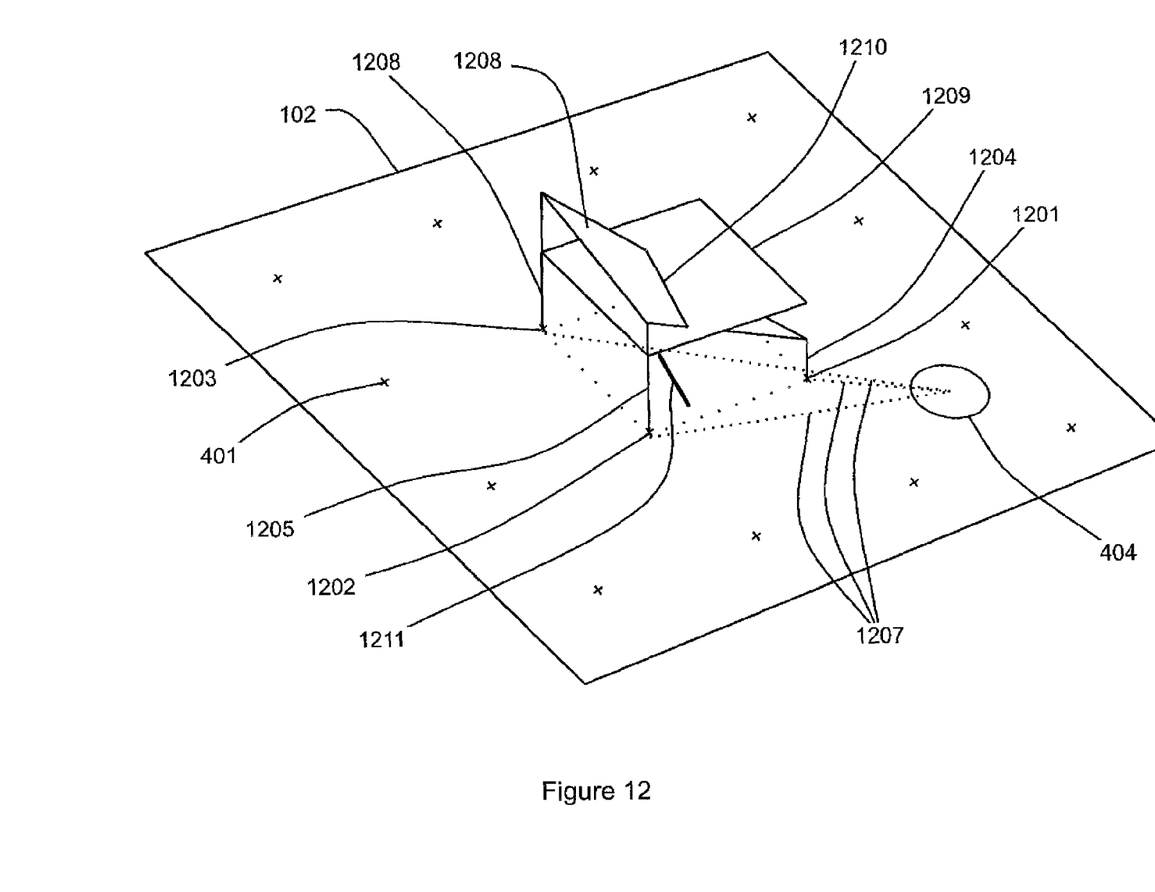
FIGS. 12 and 13 are illustrations of processing performed by the computer system of FIG. 3.

With reference to FIG. 12 the trigonometric interpolation process comprises the steps of selecting the non-closest sensor 404 to the acoustic emission, that is, one of the sensors having a non-zero ToF. Then for each of the three closest data points 1201, 1202, 1203 to the sensor 404, constructing a line 1204, 1205, 1206 normal to the plane 102 of the data points. The length of each line 1204, 1205, 1206 is relative to the length of the respective relative data point ToF 1207. The ends of the lines 1204, 1205, 1206 define a triangular plane 1208. A further plane 1209 is constructed to represent the acoustic emission ToF. The acoustic emission plane 1209 is parallel to the plane 102 of the data points and constructed using the same units of measurement as those used to construct the data point ToF plane 1208. Thus the acoustic emission plane 1209 is spaced from the data point plane 102 by a distance relative to the acoustic emission ToF for the sensor 404. The data point ToF plane 1208 and the acoustic emission ToF plane 1209 have an intersection 1210 which is calculated and then projected onto the plane 102 of the data points.

Figure 13:
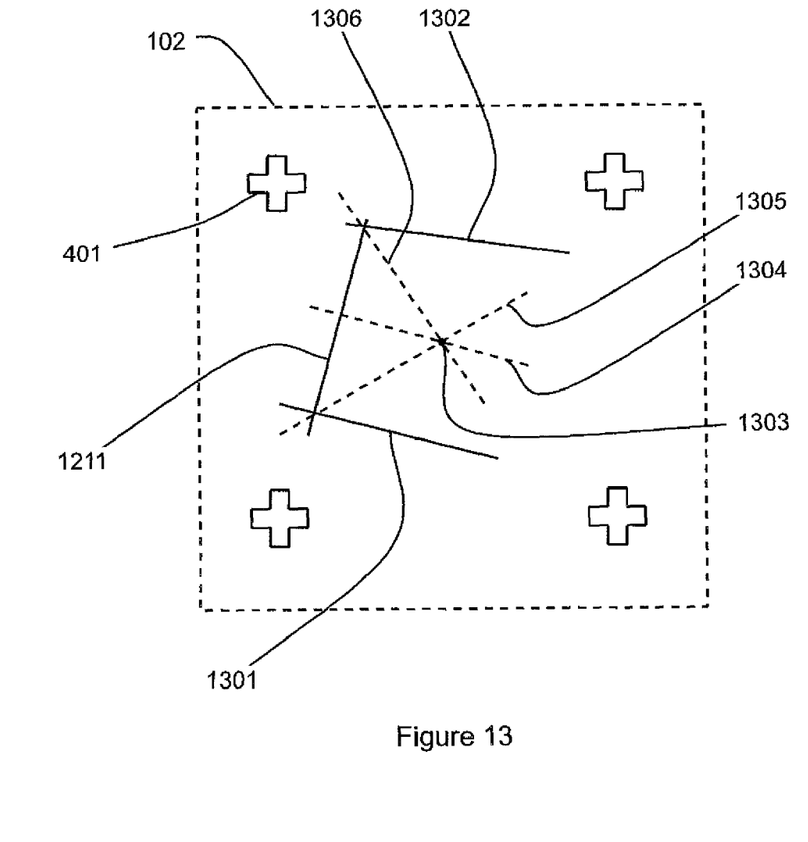

The projected intersection 1211 is then stored while the above process is repeated for the remaining two sensors having non-zero ToFs, that is, the two other sensors furthest from the acoustic emission. With reference to FIG. 13, this process results in the creation of two further respective projected intersections 1301, 1302. Since one of the sensors 202, 203, 204, 205 is used as a reference, the number of projected intersection lines is one less than the number of considered sensors. Once the projected intersections 1211, 1301, 1302 have been determined, the location 1303 of the acoustic emission is calculated from the intersection of the respective average lines 1304, 1305, 1306 between the projected intersections 1211, 1301, 1302 as shown in FIG. 13.

Figure 14:
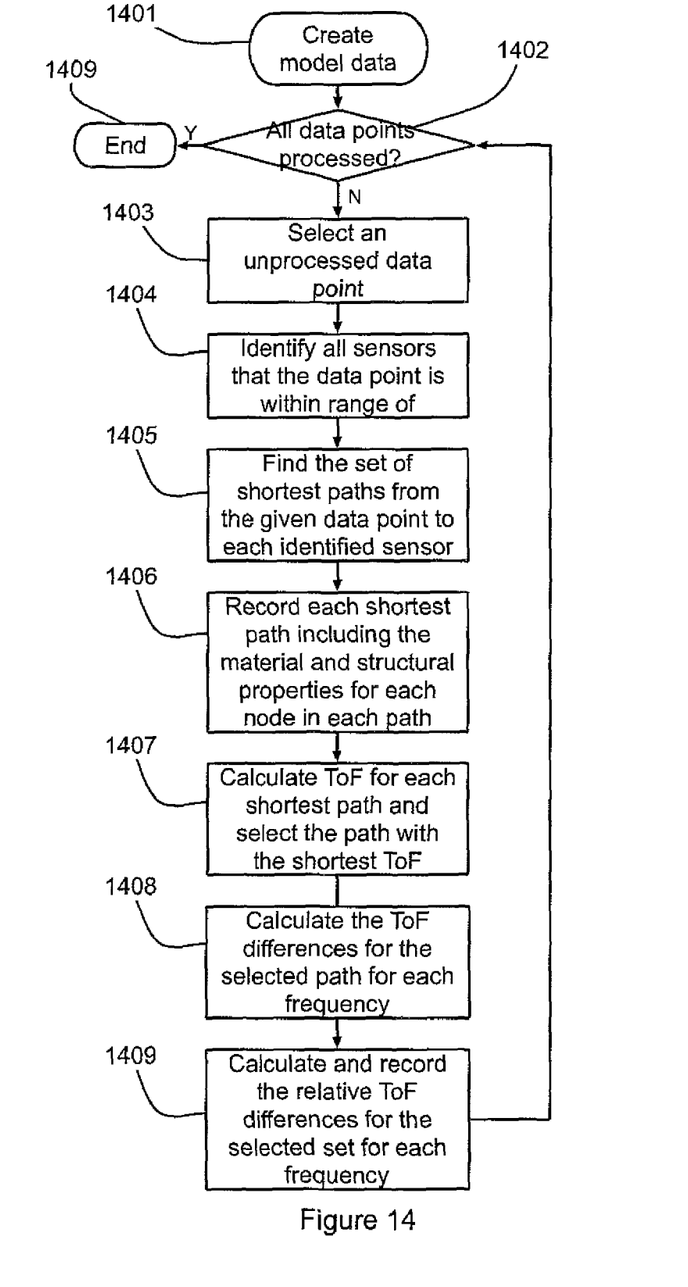
FIGS. 14 and 15 are flow charts illustrating the processing performed by the computer system of FIG. 3.

The processing performed by the structural modelling system 305 when determining the data point ToFs will now be describe further with reference to the flow chart of FIG. 14. At step 1401, a user identifies the structure model 306 and the structure data 307 and inputs the command to produce the model data point ToFs. Processing then moves to step 1402, at which a loop condition is set that ensures that the subsequent steps 1403 to 1408 are performed so as to produce data point ToFs for each data point 401 in the model. At step 1403, a first unprocessed data point 401 is selected and processing moves to step 1404. At step 1404, each sensor location for which the selected data point would be within range is identified using the sensor sphere of influence data and the data point and sensor location data in the tables of FIGS. 5 and 7. Processing then moves to step 1405 where, using a shortest path algorithm, a set of candidate shortest paths are calculated for the selected data point, via other data points, to each identified sensor. The set of candidate shortest paths is the set of all paths from the selected data point to each identified sensor that are less than a predetermined distance threshold. As noted above, a set of candidate paths are selected at this stage because, prior to calculating the ToFs for each path, it is not possible to determine the fastest path. This is because the ToF is governed by the physical attributes of a given path. In other words, the physically shortest path may not have the shortest ToF because its physical attributes may delay the transmission of an AE by a greater degree than some other physically longer path.

Processing moves to step 1406 where the structure data 307 for each data point in each of the set calculated shortest path is retrieved from the table of FIG. 9 and processing moves to step 1407. At step 1407, the data point ToF is calculated from the sum of the ToFs for each sub path between each data point along each shortest path, taking into account the structure and relevant dispersion curves for each sub path. The path having the shortest calculated ToF is then selected as the shortest path between the given data point and sensor. Processing then moves to step 1408 where the relative data point ToFs are calculated and recorded along with the relevant sensor identifiers and their associated frequencies as shown in the table of FIG. 10. Processing then returns to step 1402 until all the data points 401 have been processed after which processing end at step 1409.

Figure 15:
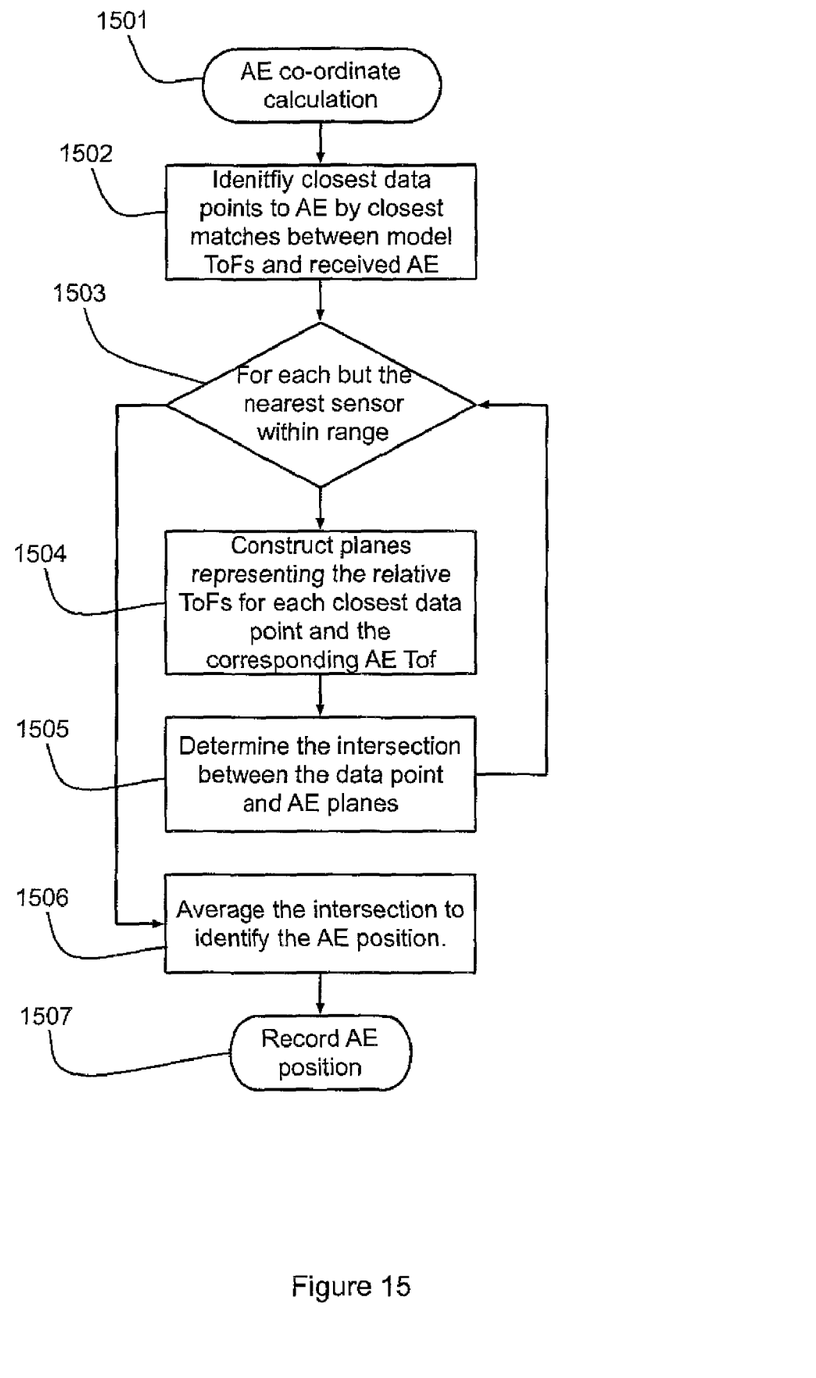

The processing performed by the acoustic emission location system 302 when identifying the location of an acoustic emission detected by the acoustic emission monitoring system 105 will now be described with reference to FIG. 15. At step 1501, the processing is initiated when data from the acoustic emission monitoring system 303 is received and processing moves to step 1502. At step 1502, the data point ToF data in the table of FIG. 10 is searched for a match against the received acoustic emission ToF data as shown in the table of FIG. 11. In the present embodiment, the three closest matches are selected as the data points closest to the source of the acoustic emission. Processing then moves to step 1503, where a processing loop is set for applying steps 1504 and 1505 to the ToFs from each of the closest data points to each given sensor, except the closest sensor, in turn. At step 1504, two planes are constructed, one representing the relative data point ToFs and another representing the relative acoustic emission ToF to the given sensor. Processing then moves to step 1505 where the intersection between the two planes is calculated and recorded as described above. Processing then returns to step 1503 from which steps 1504 and 1505 are repeated until the plane intersections for each sensor, except the closest sensor, have been calculated at which point processing moves to step 1506. At step 1506, the average of the plane intersections are calculated so as to identify the location of the acoustic emission. Processing then moves to step 1507 where the calculated position of the acoustic emission is recorded and processing ends. The calculated position of the acoustic emission can then be used to inspect or repair the region of the structure where the damage that emitted the acoustic emission occurred.

In another embodiment the grid of data points includes further edges so as to provide each data point with a further closest neighbours. Increasing the number of vertices or neighbours in this manner reduces the possible shortest path error. As will be understood by those skilled in the art, the resolution of the grid of data points determines the margin of error in locating acoustic emission. The greater the grid resolution, the smaller the margin of error. Also, the pattern of the grid need not be uniform, that is, the data points may be randomly located over the model structure.

In a further embodiment, the structure data includes fibre orientation for composites materials so that the effect of the fibre orientation on the propagation of sound waves can be accounted for when determining the data point ToFs.

In a further embodiment, instead of calculating data point ToFs taking into account the structure data for each sub-path, the ToF for the path as a whole is determined based on average material properties such as density, modulus of elasticity or Poisson coefficient for the structure as a whole. The average material properties are applied to path lengths while the structural properties of the structure such as material thickness, curvature and voids may still be considered for each sub-path.

In another embodiment, the system operates using absolute ToF measurements. In a further embodiment, the data point ToFs are created using a physical specimen of the structure to be monitored for acoustic emissions.

As will be appreciated by those skilled in the art, the system may operate with a single acoustic emission wave mode or with multiple wave modes simultaneously. Where the system is arranged to operate with multiple wave modes, arrays of sensors are provided at the appropriate frequency bands for each mode. Any combination of single or multi frequency sensors may be used depending on the application.

As will be appreciated by those skilled in the art, in some cases an intersection line may not be created since the plane constructed from the data point ToFs may be above or below the plane created from the acoustic emission ToF. In this case, the amplitude of the acoustic emission ToF is normalised across the sensors so as to provide a set of plane intersections.

As will be understood by those skilled in the art, any suitable interpolation technique may be used for interpolating the location of an acoustic emission from the positions of a set of data points, the data point ToFs and a set of acoustic emission ToFs to a set of sensors.

As will be understood by those skilled in the art, any suitable shortest path algorithm may be used for determining the shortest or quickest path between each data point and each sensor.

As will be appreciated by those skilled in the art, the system described above may be provided as a single system installed onboard the structure to be monitored or may comprise an onboard acoustic detection system, such as the VIGILANT™ Acoustic Detection System provided by Ultra Electronics Ltd, arranged to collect AE data for off-board analysis.

It will be understood by those skilled in the art the systems described above may be applied to any structure or part of a structure in which damage causing acoustic emission needs to be monitored or detected. These systems may be applied in the automotive, marine, aerospace, power generation, civil or any other applicable engineering field.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method for determining the location of an acoustic emission emitted in a physical structure, said method comprising the steps of:
   creating a computer model of said structure, said model identifying a set of predetermined sensor locations in said structure;
   selecting a set of data points on said model, each said data point being located at a known location;
   calculating, from said model, a set of time of flights (ToFs) for an acoustic emission from each of said data points to each of said set of predetermined sensor locations, said sets of ToFs calculated from a set of one or more candidate shortest paths in said model between each of said data points via a set of other of said data points to each of said sensor locations, the ToF for each path taking into account one or more acoustic emission propagation characteristics of said path;
   providing a set of sensors in said structure at said set of predetermined sensor locations, each said sensor being arranged to detect acoustic emissions from said structure;
   receiving an acoustic emission at said sensors and determining the set of ToFs of said acoustic emission to each said sensor;
   identifying a closest match between said sets of ToFs calculated from said model and said set of ToFs for said received acoustic emission and determining the set of closest data points to the origin of said acoustic emission; and
   mathematically interpolating the location of said origin of said acoustic emission from said known data point locations, said sets of ToFs for each of said set of closest data points and said set of ToFs for said received acoustic emission.

2. A method according to claim 1 in which said interpolation is trigonometric interpolation.

3. A method according to claim 1 in which said set of ToFs for said acoustic emission and for each said data point are measured relative to the shortest ToF in each said set.

4. A method according to claim 1 in which said sets of ToFs for said data points are predetermined.

5. A method according to claim 1 in which said data point locations are arranged as a grid, said data points being located at the vertices of said grid and each edge of said grid defining a possible path between said data points.

6. A method according to claim 5 in which said data points are interconnected by four or more edges.

7. A method according to claim 1 in which each said ToF for said data points is calculated taking into account the structural properties of the respective shortest path.

8. A method according to claim 7 in which said structural properties of said structure are defined for each vertex of said grid.

9. A method according to claim 7 in which said structural properties comprise the mechanical properties of said structure.

10. A method according to claim 7 in which said structural properties comprise the structural features said structure.

11. A method according to claim 7 in which said structural properties comprise the acoustic emission propagation characteristics of said structure.

12. A method according to claim 11 in which said acoustic emission propagation characteristics are defined for one or more wave modes.

13. A method according to claim 1 in which each of said set of ToF for said data points are determined for a set of one or more acoustic emission frequency bands.

14. A method according to claim 13 in which said received acoustic emission is analyzed with respect to one or more of said acoustic emission frequency bands.

15. A computer program product, said product stored on a non-transitory computer readable storage medium, which controls a computer to perform the method of claim 1.

16. Apparatus for determining the location of an acoustic emission emitted in a physical structure, said apparatus comprising a computer having circuitry configured to:
create a computer model of said structure, said model identifying a set of predetermined sensor locations in said structure;
select a set of data points on said model, each said data point being located at a known location;
calculate from said model a set of time of flights (ToFs) for an acoustic emission from each of said data points to each of said set of predetermined sensor locations, said sets of ToFs calculated from a set of one or more candidate shortest paths in said model between each of said data points via a set of other of said data points to each of said sensor locations, the ToF for each path taking into account one or more acoustic emission propagation characteristics of said path;
provide a set of sensors in said structure at said set of predetermined sensor locations, each said sensor being arranged to detect acoustic emissions from said structure;
receive an acoustic emission at said sensors and determining the set of ToFs of said acoustic emission to each said sensor;
identify a closest match between said sets of ToFs calculated from said model and said set of ToFs for said received acoustic emission and determining the set of closest data points to the origin of said acoustic emission; and
mathematically interpolate the location of said origin of said acoustic emission using said known locations, said sets of ToFs for each of said set of closest data points and said set of ToFs for said received acoustic emission.

17. Apparatus according to claim 16 in which said interpolation is trigonometric interpolation.

18. Apparatus according to claim 16 in which said set of ToFs for said acoustic emission and for each data point are measured relative to the shortest ToF in each said set.

19. Apparatus according to claim 16 in which said sets of ToFs for said data points are predetermined.

20. Apparatus according to claim 16 in which said data point locations are arranged as a grid, said data points being located at the vertices of said grid and each edge of said grid defining a possible path between said data points.

21. Apparatus according to claim 20 in which said data points are interconnected by four or more edges.

22. Apparatus according to claim 16 in which each said ToF for said data points is calculated taking into account the structural properties of the respective shortest path.

23. Apparatus according to claim 22 in which said structural properties of said structure are defined for each vertex of said grid.

24. Apparatus according to claim 22 in which said structural properties comprise the mechanical properties of said structure.

25. Apparatus according to claim 22 in which said structural properties comprise the structural features said structure.

26. Apparatus according to claim 22 in which said structural properties comprise the acoustic emission propagation characteristics of said structure.

27. Apparatus according to claim 26 in which said acoustic emission propagation characteristics are defined for one or more wave modes.

28. Apparatus according to claim 16 in which each of said set of ToF for said data points are determined for a set of one or more acoustic emission frequency bands.

29. Apparatus according to claim 28 in which said received acoustic emission is analysed with respect to one or more of said acoustic emission frequency bands.

* * * * *